US011847144B2

(12) United States Patent
Filios et al.

(10) Patent No.: US 11,847,144 B2
(45) Date of Patent: Dec. 19, 2023

(54) SYSTEMS AND METHODS OF CORRELATING DATABASE ENTRIES FOR AUTOMATED METRIC COMPUTATION

(71) Applicant: TD Ameritrade IP Company, Inc., Omaha, NE (US)

(72) Inventors: Stephen Filios, Canton, MI (US); Logan Sommers Ahlstrom, Ann Arbor, MI (US); Katie Marie Digilio, La Vista, NE (US); Ravindra Reddy Tappeta Venkata, Novi, MI (US); Eric John Hains, West Orange, NJ (US)

(73) Assignee: CHARLES SCHWAB & CO., INC., San Francisco, CA (US)

( * ) Notice: Subject to any disclaimer, the term of this patent is extended or adjusted under 35 U.S.C. 154(b) by 54 days.

(21) Appl. No.: 16/877,402

(22) Filed: May 18, 2020

(65) Prior Publication Data

US 2021/0357436 A1    Nov. 18, 2021

(51) Int. Cl.
*G06F 16/00* (2019.01)
*G06F 16/28* (2019.01)
*G06F 16/2457* (2019.01)
*G06F 16/248* (2019.01)

(52) U.S. Cl.
CPC ......... *G06F 16/288* (2019.01); *G06F 16/248* (2019.01); *G06F 16/24578* (2019.01)

(58) Field of Classification Search
CPC . G06F 16/288; G06F 16/248; G06F 16/24578
USPC .................................................. 707/600–899
See application file for complete search history.

(56) References Cited

U.S. PATENT DOCUMENTS

| | | | |
|---|---|---|---|
| 10,567,402 B1* | 2/2020 | Comeaux | H04L 63/1433 |
| 2016/0344762 A1* | 11/2016 | Jou | G06F 21/577 |
| 2017/0255952 A1* | 9/2017 | Zhang | G06Q 10/06395 |
| 2019/0026473 A1* | 1/2019 | Carroll | G06F 18/285 |

* cited by examiner

*Primary Examiner* — Irete F Ehichioya
*Assistant Examiner* — Shirley D Hicks
(74) *Attorney, Agent, or Firm* — Harness, Dickey & Pierce, P.L.C.

(57) ABSTRACT

A system includes instructions for execution by at least one processor, including, in response to an event, obtaining a first set of alerts stored in the alert database corresponding to a first scenario of a set of scenarios and selecting a first model of a set of models corresponding to the first scenario and identifying a first set of features stored in the features database corresponding to the first scenario. The instructions include, for each alert of the first set of alerts, identifying a first identifier included in the alert, retrieving the first set of features of the first identifier from the parameter database, determining a score using the first model based on the retrieved first set of features, and adding the alert and the score to a result list. The instructions include displaying, on a user device, the result list including the first set of alerts and corresponding scores.

18 Claims, 6 Drawing Sheets

| Foreign Transaction Result List | | |
|---|---|---|
| Identifier | Score | Influential Feature |
| 123 | 0.8 | Account Age |
| 234 | 0.3 | Previous Peak Credit |
| 345 | 0.2 | Amount Total |

FIG. 3

SYSTEMS AND METHODS OF CORRELATING DATABASE ENTRIES FOR AUTOMATED METRIC COMPUTATION

FIELD

The present disclosure relates to systems and methods of database-oriented computation and more particularly to systems and methods of correlating entries within the database for automated metric computation.

BACKGROUND

Anti-money laundering (AML) alerts pose a significant administrative burden to a variety of entities—including financial entities. In various entities, vast amounts of alerts are generated for review by human analysts to determine if additional action is required. Because identifying AML activity is essential, many of the alerts are actually false positives, resulting in a large of amount of alerts that are reviewed by an analyst but require no additional consideration.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores an alert database including a set of alerts for each scenario of a set of scenarios. Each alert includes an identifier. The memory stores a model database including a set of models. Each model of the set of models is associated with at least one scenario of the set of scenarios. The memory stores a parameter database including data for a set of identifiers, a features database including a set of features for each model of the set of models, and instructions for execution by the at least one processor. The instructions include, in response to an event, obtaining a first set of alerts stored in the alert database corresponding to a first scenario of the set of scenarios. The instructions include selecting a first model of the set of models corresponding to the first scenario and identifying a first set of features stored in the features database corresponding to the first scenario. The instructions include, for each alert of the first set of alerts, identifying a first identifier included in the alert, retrieving the first set of features of the first identifier from the parameter database, determining a score using the first model based on the retrieved first set of features, and adding the alert and the score to a result list. The instructions include displaying, on a user device, the result list including the first set of alerts and the corresponding scores.

In other features, the instructions include, for each alert of the set of alerts, identifying, using the first model, a subset of features of the first set of features used to determine the score and adding the subset of features to the result list. In other features, the set of features for each model represent features used by the model to score an alert. In other features, the event includes receiving a request from a user device indicating the first set of alerts. In other features, the event includes a first threshold time elapsing.

In other features, each alert includes: (i) a transaction identifier and (ii) a threshold exceeded. In other features, the parameter database includes, for each user identifier: (i) an account type, (ii) a total account amount, (iii) trading frequency, and (iv) an average trading amount. In other features, the instructions include sorting the result list based on the score of each alert of the set of alerts. In other features, the instructions include, in response to receiving analyst feedback corresponding to a first alert, updating the first model based on the analyst feedback and a first score corresponding to the first alert and the analyst feedback indicates the first alert is (i) important or (ii) unimportant. In other features, the memory stores a result list database and the instructions include storing the result list in the result list database.

A method includes, in response to an event, obtaining a first set of alerts stored in an alert database corresponding to a first scenario of a set of scenarios. The alert database stores a set of alerts for each scenario of the set of scenarios. Each alert includes an identifier. The method includes selecting a first model of a set of models corresponding to the first scenario. A model database stores the set of models and each model of the set of models is associated with at least one scenario of the set of scenarios. The method includes identifying a first set of features stored in a features database corresponding to the first scenario. The features database stores a set of features for each model of the set of models. The method includes, for each alert of the first set of alerts, identifying a first identifier included in the alert and retrieving the first set of features of the first identifier from a parameter database. The parameter database stores data for a set of identifiers. The method includes determining a score using the first model based on the retrieved first set of features and adding the alert and the score to a result list. The method includes storing the result list including the first set of alerts and the corresponding scores.

In other features, the method includes, for each alert of the set of alerts, identifying, using the first model, a subset of features of the first set of features used to determine the score and adding the subset of features to the result list. In other features, the method includes displaying, on a user device, the result list including the first set of alerts and the corresponding scores. In other features, the set of features for each model represent features used by the model to score an alert. In other features, the event includes receiving a request from a user device indicating the first set of alerts. In other features, the event includes a first threshold time elapsing.

In other features, each alert includes: (i) a transaction identifier and (ii) a threshold exceeded. In other features, the parameter database includes, for each user identifier: (i) an account type, (ii) a total account amount, (iii) trading frequency, and (iv) an average trading amount. In other features, the method includes sorting the result list based on the score of each alert of the set of alerts. In other features, the method includes, in response to receiving analyst feedback corresponding to a first alert, updating the first model based on the analyst feedback and a first score corresponding to the first alert. The analyst feedback indicates the first alert is (i) important or (ii) unimportant. In other features, the method includes storing the result list including the first set of alerts and the corresponding scores in a result list database.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 3 is an example user interface displaying a result list.

In the drawings, reference numbers may be reused to identify similar and/or identical elements.

DETAILED DESCRIPTION

Figure 1:
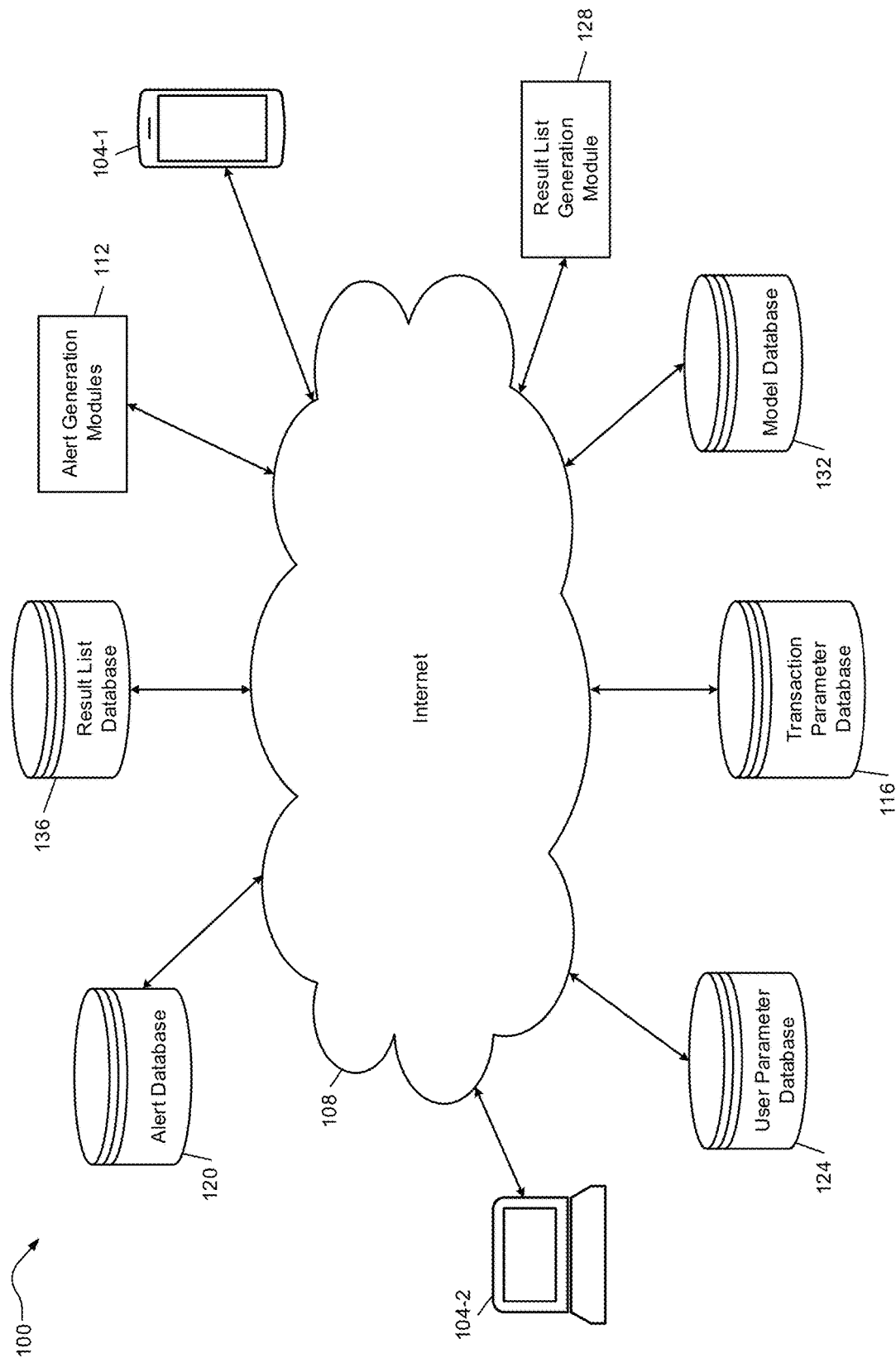
FIG. 1 is a high-level block diagram of an example network communication system including a result list generation system according to the principles of the present disclosure.

A result list generation system obtains a variety of anti-money laundering (AML) alerts and scores the AML alerts using machine learning algorithms that model analyst behavior. Scoring the AML alerts provides an indicator to analysts who review the alerts as to which of the alerts are more suspicious or interesting, directing attention to those alerts that may benefit from prompt, additional attention based on historical analyst treatment of the alerts.

Financial entities monitor users and account to identify potential money laundering activity, which results in lists of AML alerts that an analyst must review. For purposes of this disclosure, the prefix AML relates to user or account activity and transactions that indicates money laundering may be present. For example, an AML alert is generated when a parameter of a particular transaction violates a threshold that is set to identify money laundering activity. Because AML alerts may be rule-based and generated when a parameter of a particular transaction exceeds a threshold, the alerts may— for the most part—be uninteresting and not require any action.

For various financial institutions, analysts have to comb through thousands of AML alerts every day, some of which are easier to distinguish as real alerts or false positives. The rules-based alerting system uses a series of binary conditions to create alerts for analyst review. To assist analysts and to more quickly identify urgent alerts, the result list generation system scores and organizes the alerts to show analysts the most important or interesting alerts based on historical analyst analysis of alerts.

Importantly, the result list generation system is not trying to predict if an activity is actually money laundering, nor is it trying to completely replace the expertise of human analysts. Instead, models of the result list generation system are constructed to model the human behavior of what an analyst would find interesting, both from a true alert and a false positive perspective or a suspicious and not suspicious perspective.

The result list generation system helps analysts be more efficient by prioritizing alerts through learning what analysts find salient and interesting. The result list generation system obtains inputs or features and predicts which alerts are going to be the most interesting to analysts, based on previous investigations or historical data by incorporation the additional features from a variety of databases. The result list generation system combines information about the users and their transactions from various databases maintained by the relevant institution with the reasons for alert generation to determine a level of suspicion or importance: the score.

Further, the result list generation system includes a feedback loop. For example, if an alert was scored low by the result list generation system but then an analyst scores the alert as suspicious, the result list generation system is updated to learn that the alert should have been scored higher and why. In various implementations, the result list generation system applies a timing bias to weight more recent alerts higher.

Additionally, since the alerts are an unbalanced dataset, model accuracy should be based on more than simply a percentage accurate. That is, since most alerts do not merit additional review by an analyst, meaning that already 95% of the alerts may be considered not suspicious, a binary correct or incorrect does not indicate the accuracy of the result list generation system. For these reasons, the feedback loop is used to ensure the scores indicating suspicious activity are accurate and update the trained models accordingly.

Further, because of AML requirements, any process has to be completely transparent and auditable. The result list generation system provides the analyst with the driving force or more influential features behind why the action received a particular score. That is, the result list generation system includes which factors most influenced the score, such as an amount, history of suspicion, peak credit within the last 12 months, etc.

While described with respect to a financial institution or entity, the result list generation system can be implemented for a variety of institutions to model behavior of human review and assist reviewers by identifying the most important or interesting items to review. Because the result list generation system continuously retrains the models based on recent analyst or reviewer feedback, the system accounts for drift in model performance. In various implementations, the result list generation system can operate to identify any type of activity that an entity would want to monitor other than AML, such as trade surveillance across different asset classes, such as equities, options, futures, fixed income, etc.

Additionally, different models are used for different scenarios, allowing for better performance and accuracy than a single, generalized model. The result list generation system further provides a more complex picture of the alerts. The more complex picture is facilitated by incorporating a variety of databases and leveraging multiple types of data. In other words, the result list generation system is more complex simply by tracking events related to risk and connecting account and user identifiers across the variety of databases to find previously unrecognized overlaps between trading activity to portfolio structures and platform movement alongside money movement transaction data.

FIG. 1 is a high-level block diagram of an example network communication system including a result list generation system 100 according to the principles of the present disclosure. The result list generation system 100 is generally configured to generate and display a result list on a first user device 104-1 or a second user device 104-2. The first user device 104-1 and the second user device 104-2 communicate with multiple modules and a variety of databases via the Internet 108. The result list generation system 100 includes alert generation modules 112 including a plurality of alert modules configured to generate alerts related to AML scenarios. In various implementations, the alert generation modules 112 are directed to identifying other scenarios in the financial industry or otherwise.

The alert generation modules 112 are operated as rules-based engines that are configured to collect a set of data at threshold time intervals—for example, daily, weekly, monthly, etc. At the threshold time interval, the particular alert generation module obtains parameters from a transaction parameter database 116 that are factors relevant to the particular alert generation module and a particular AML scenario. There are a variety of AML scenarios that the rules-based AML alert generation modules 112 identify. The AML scenarios include: (i) foreign activity, (ii) large reportable transactions, (iii) escalation in inactive account, (iv) journals between unrelated accounts, (v) avoidance of reporting threshold, (vi) networks of accounts, entities, and customers, (vii) high-risk transactions, and (viii) rapid movement of funds.

For example, the alert generation modules 112 include a foreign activity alert module. The foreign activity alert module may be operated on a monthly basis. Each week, the foreign activity alert module collects, from the transaction parameter database 116, each transaction involving factors relevant to foreign activity alerts. The transaction parameter database 116 stores parameters of each transaction performed for an account or user. In various implementations, the transaction parameter database 116 may be emptied or moved to a historical transactions database (not shown) after a period elapses, for example, 12 months.

The factors relevant to each of the alert generation modules 112 may have a corresponding threshold and, if one of the relevant factors exceeds a threshold, the particular alert module (in this case the foreign activity alert module) will generate and transmit an alert to a corresponding list in an alert database 120. The alert may include the relevant factor that have exceeded the threshold as well as an account or a user identifier indicating the user that performed or was involved in the transaction. Since the transaction may involve multiple users, the alert may include multiple user identifiers. Additionally or alternatively, multiple alerts may be generated for a single transaction, each alert corresponding to a different user identifier involved in the transaction.

In various implementations, the alert may be directly transmitted to the first user device 104-1 or the second user device 104-2, alerting the analyst of a potential AML scenario. The alert database 120 stores a set of lists including the generated alerts. The set of lists include a separate list for each AML scenario. Therefore, when these lists are generated on a reoccurring basis, analysts can access each list in order to review each generated alert to determine if the identified activity or scenario presents a suspicious enough AML scenario.

Since each module of the alert generation modules 112 generates and stores a list including alerts for a batch of transactions that occurred over a threshold period, the lists of alerts can be long. Therefore, analyst review of each of the lists at the various intervals at which the lists are generated is time-consuming. Further, because the modules of the alert generation modules 112 are rule-based and generate an alert when thresholds are exceeded, a lot of alerts generated that suggest AML activity or in AML scenario are actually not suspicious when reviewed in light of user or account parameters of the user who performed or was involved in the transaction. These user and account parameters are stored in a user parameter database 124. The user parameter database 124 stores features or parameters including a user identifier, account identifiers, account totals, personal identifying information including name, date of birth, etc.

To enhance and reduce analyst review time, a result list generation module 128 implements a machine learning algorithm to model analyst behavior to assess the transactions of each alert in view of additional features related to the transaction. The result list generation module 128 obtains the lists of alerts from the alert database 120 and scores the alerts included in the list alerts using models stored in a model database 132.

As was mentioned previously, the alert database 120 stores a list of alerts for each AML scenario. Similarly, the model database 132 stores a model for each AML scenario. The models stored in the model database 132 are implemented as machine learning algorithms and are trained using historical transactions and analyst review feedback as training data. The analyst feedback includes whether a particular transaction is suspicious or not and may further include a particular feature that drives the suspicious or not classification.

The models output a score indicating a suspicion or importance level. The models stored in the model database 132 have a corresponding feature set that influence the score. The feature set for each model varies based on which user parameter or which transaction parameter influences or affects the corresponding AML scenario as indicated by analyst behavior. Additionally, based on the training of the models, the features for each model may be weighted based on how influential the factor is to the corresponding AML scenario.

The result list generation module 128 retrieves, for each alert of the list of alerts, the features used by the corresponding model to score the alert. For example, the result list generation module 128 obtains a foreign activity alert list from the alert database 120. Additionally, the result list generation module 128 selects the foreign activity model from the model database 132. The foreign activity model has a corresponding feature set of the features that influence the foreign activity score (how suspicious a particular transaction corresponding to an alert in the foreign activity alert list appears) within the model or stored in the result list generation module 128. To model analyst behavior, the result list generation module 128 obtains the feature set for the particular alert from the user parameter database 124.

That is, the result list generation module 128 identifies the user identifier corresponding to, for example, a first alert of the foreign activity alert list and obtains the feature set for the user identifier from the user parameter database 124. The foreign activity model can then score the particular alert as to how suspicious the particular transaction of the alert actually is in light of the features that an analyst considers most relevant to this AML scenario: foreign activity.

The features most relevant to each scenario may include data from a variety of databases. The result list generation module 128 ties together the data of the various databases by correlating identifiers in the alert to the various databases, including both the transaction parameter database 116 and the user parameter database 124. The result list generation module 128 can further sort and rank the foreign activity alerts based on the scores and output a result list to the user device including the reorganized and scored alerts. In various implementations, the result list generation module 128 can store the resulting list in a result list database 136.

Figure 2:
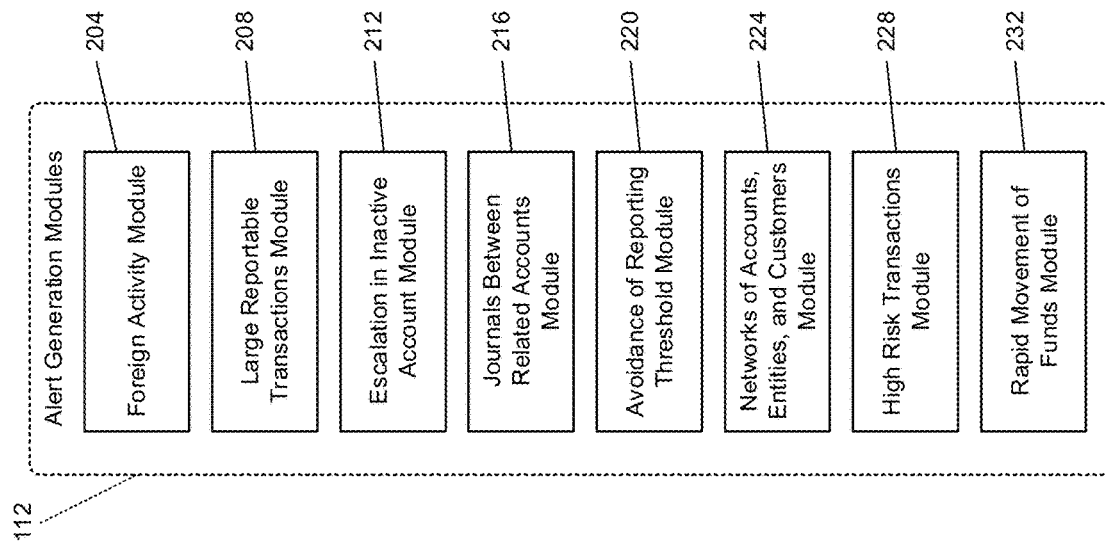
FIG. 2 is a graphical representations of example alert generation modules.

FIG. 2 is a graphical representations of example alert generation modules. The alert generation modules 112, the alert database 120, the model database 132, and the result list database 136 each have items that correspond to one of the AML scenarios listed previously. For example, FIG. 2 depicts each of the alert generation modules 112. The alert generation modules include: (i) a foreign activity module 204, (ii) a large reportable transactions module 208, (iii) an escalation in inactive account module 212, (iv) a journals between unrelated accounts module 216, (v) an avoidance of reporting threshold module 220, (vi) a networks of accounts, entities, and customers module 224, (vii) a high-risk transactions module 228, and (viii) a rapid movement of funds module 232.

To identify alerts relevant to foreign activity, the foreign activity module 204 may identify suspicious transactions on a monthly basis. Generally, a sudden change in transaction activity may be suspicious and warrant additional investigation. The large number of various types of transactions within an account including funds transfers, checks presented, cash deposits, etc., on a daily basis make changes or anomalies difficult to detect in account activity. The foreign activity module 204 reviews transaction activity and detects significant changes from the typical activity of an account. The foreign activity module 204 identifies accounts and correspondent banks that may be considered to be at risk by monitoring for foreign electronic funds transfers and check transactions and detecting significant changes from the previous monthly foreign transaction activity.

In various implementations, the foreign activity module 204 identifies behavior changes in foreign transactions for seasoned accounts and seasoned correspondent banks. A seasoned account may be defined as an account that is opened on or before for a threshold number of days from a current date. For a correspondent bank, the account associated with the correspondent bank with the earliest account open date is checked to determine whether the correspondent bank is seasoned. Behavior profiles are based on activity during the specified number of months prior to a current month for accounts and correspondent banks. The current month's credit foreign activity is compared to the credit foreign activity from the specified previous months to generate alerts for credit behavior changes that are significant. Debit foreign activity is monitored in the same manner. However, the foreign activity module 204 generates one alert only for the credit foreign behavior change or the debit foreign behavior change or both.

To identify large reportable transactions, the large reportable transactions module 208 may be run weekly. Certain countries require that financial institutions report customer transactions that exceed a threshold amount. These requirements typically pertain to new customer relationships and transactions associated with account opening. The requirements may also pertain to existing customer relationships. Users may also have internal policies that require the reporting or review of transactions exceeding threshold amounts.

The large reportable transactions module 208 identifies deposits of any type (across products and asset types), made at account opening or within a certain period after account opening, that exceed an opening threshold amount. The definition of new account is configurable. The large reportable transactions module 208 also identifies deposits or withdrawals of any type (across products and asset types) in existing accounts that exceed an existing threshold. The large reportable transactions module 208 identifies transactions involving a single account or multiple accounts that are linked to the customer or household through the user's house holding process. In various implementations, the large reportable transactions module 208 provides separate thresholds for each type of relationship (new or existing) that are tunable to support user and country specific regulatory requirements.

In various implementations, the large reportable transactions module 208 focuses on three types: user focus, household focus, and external entity focus. The large reportable transactions module 208 identifies cases where deposits or withdrawals of any type of transaction that a user, household, or external entity made over a threshold time aggregate over a threshold amount.

The escalation in inactive account module 212 may be operated daily. Money launderers may open accounts, deposit illicit funds, conduct a small number of transactions to test the system, and then leave the account alone for a period to avoid raising suspicions. Money launderers then remove a significant portion of the balance of the account, often leaving the remaining balance behind to avoid detection. The escalation in inactive account module 212 generates an alert for accounts that are inactive for a predefined period and then have a sudden escalation in activity.

The escalation in inactive account module 212 identifies accounts that may be considered to be at risk based on the number, amount, or a large portion of recent transactions in contrast to a previous dormant status. The user's risk exposure is greater for outgoing funds relative to incoming funds. The escalation in inactive account module 212 then monitors significant withdrawal activity at more stringent thresholds than deposit activity.

The escalation in inactive account module 212 considers accounts with fewer than three instances of trade, withdrawal, or deposit activity in a threshold period—for example, the last six months—inactive and are candidates for an escalation in inactive account alert. The escalation in inactive account module 212 considers all types of transactions, except for intra-household journal transactions and cancelled transactions. In various implementations, the escalation in inactive account alert is generated if one of the following condition is true: (i) an aggregate disbursement transaction amount is greater than or equal to a minimum disbursement transaction amount or (ii) an aggregate deposit transaction amount is greater than or equal to a minimum deposit transaction amount.

The journals between unrelated accounts module 216 may be run daily. Money launderers may establish a number of accounts within a single institution, often establishing relationships at multiple branches using aliases or slightly different identifying information. Money launderers then move their money between accounts as part of a layering strategy, often consolidating the funds in a single account before removing them from the institution. Without a known link, institutions have an extremely difficult time identifying these relationships.

The journals between unrelated accounts module 216 identifies an account that conducts journal transactions to one or more unrelated accounts. A journal transaction is considered unrelated when the transaction occurs between accounts that do not share tax identifiers, do not share a customer, are not in the same household, and are not known to have a formal relationship. The aggregated value for all transactions is higher than a threshold amount, and the transactions are conducted within a specified period (for example, 14 calendar days).

To identify avoidance of reporting threshold, the avoidance of reporting threshold module 220 may review relevant transaction data weekly. Money launderers seeking to place or move funds in the banking system may structure their cash or monetary instrument transactions to avoid reporting requirements, such as the filing of a currency transaction report (CTR) or other report required in a given country. The institution may wish to monitor more closely any accounts, customers, households, or external entities engaging in such activity.

The avoidance of reporting threshold module 220 identifies instances of cash or monetary instrument transactions in amounts just below applicable reporting thresholds during a specified period. In various implementations, the avoidance of reporting threshold module 220 uses multiple threshold sets to accommodate reporting requirements that may differ by country or jurisdiction, as well as to support multiple thresholds within a country or jurisdiction (that is, support of CTR and cash log thresholds can occur simultaneously).

In general, the avoidance of reporting threshold module 220 identifies structuring activities designed to avoid reporting thresholds. Since the reporting requirement thresholds are determined by the regulatory agency where accounts are domiciled, the thresholds are set using the base currency amount. Using the base currency amount where the accounts are domiciled avoids the frequent tuning of the thresholds due to the currency exchange rate in the case where the values are provided in the user's base currency. Transaction amounts may be aggregated daily and the amounts in one day or two consecutive days are checked with two reporting thresholds.

The avoidance of reporting threshold module 220 generates alerts when: a number of attempts is greater than or equal to a minimum number of attempts for days of the week Friday to Monday. Consecutive days is defined as two days between Friday and Monday when transactions occur on both days. For example, Friday and Saturday are considered consecutive if there are transactions on both days. If no transactions occur on Saturday but do on Friday and Sunday, they are considered consecutive. Similarly, Friday and Monday are considered consecutive if transactions occur on these two days but not on any of the intermediate days—Saturday and Sunday. The intent of this logic is to model weekends in an optimal way.

To identify networks of accounts, entities, and customers, the networks of accounts, entities, and customers module 224 may identify suspicious transactions relevant to this scenario weekly. The networks of accounts, entities, and customers module 224 generates an alert identifying a network of seemingly unrelated accounts, external entities, and customers. The networks of accounts, entities, and customers module 224 identifies relationships between unrelated accounts, between internal accounts and external entities, and between users and accounts having no known relationship. These entities can be related by transactions or through shared common attributes such as tax ID, e-mail, phone number, address, and password, each of which is a parameter stored in the transaction parameter database 116.

The networks of accounts, entities, and customers module 224 implements link analysis. Link analysis is a technique useful for finding networks of entities—that is, entities that are tied together by some chain of connections. For example, a set of seemingly unrelated accounts may compose a network because they are linked together by some chain of fund transfers. Link analysis is extremely useful for AML and fraud detection because criminals often work in fraud rings and link analysis helps expose these rings. The networks that are detected may be based on transaction activity as well as shared attributes. This enables the detection of money laundering and fraud rings that might otherwise go undetected.

To identify alerts corresponding to high-risk transactions, the high-risk transactions module 228 may obtain and analyze relevant activity weekly. Financial institutions apply enhanced scrutiny to transactions involving high-risk entities, as such activity that may subject the institution to a greater risk of money laundering or fraud. Any account, customer, correspondent bank, or external entity found on a watch list is considered a high-risk entity. The high-risk transactions module 228 identifies transactions to and from high-risk entities during a specified period.

The high-risk transactions module 228 uses risk factors identified from watch list entries that are: (i) deemed risky and (ii) for known external high-risk entities. The entries deemed risky may be specified for an account or a user. When a watch list entry is specified for a user, the risk rating is reflected on all of that user's accounts. For known external high-risk entities, the high-risk transactions module 228 identifies transactions based on name, identification number (such as tax ID or social security number), account number, etc.

To identify alerts corresponding to rapid movement of funds, the rapid movement of funds module 232 may obtain and analyze relevant activity weekly. Money launderers typically move funds between accounts to help integrate the funds and give the appearance of legitimacy. One possible indication of money laundering activity is the rapid movement of funds into and out of an account. The rapid movement of funds module 232 identifies both new accounts and users and more seasoned accounts and users that move transactions of all types in and out of an account or accounts within a specified period. The rapid movement of funds module 232 can consider the amount or velocity of funds through the account relative to the account balance or net worth.

The rapid movement of funds module 232 can focus on accounts and users using different thresholds for new and more seasoned accounts or users based on a number of days the account or user has existed in the system. For the account-focused scenario, the account open date of the relevant account is used to decide whether the relevant account is new or seasoned. For the customer-focused scenario, the earliest account open date among accounts associated with the customer is used to decide whether the customer is new or seasoned.

For the alert generations modules 112 described above, the various parameters listed can also be used as features by the corresponding model. For example, the foreign activity module 204 may generate a foreign activity alert and add it to the list of alerts simply due to which foreign account is receiving a transaction from the user's account as alerts may be generated on a per parameter basis. However, a foreign activity model in the model database 132 may determine that the transaction associated with the alert is even more suspicious due to the amount of the transaction. Therefore, the above parameters are used as thresholds as well as features influencing the scores calculated by the models of the model database 132. Additional features may include an activity risk factor, account age, average transaction amount, current transaction amount, peak/minimum/total credit and debit over a period, net worth, daily credit and debit totals, familial relationships, etc.

FIG. 3 is an example user interface displaying a result list 300. The result list 300 includes alerts related to foreign transaction alerts. The result list 300 includes a first column 304 listing identifiers. The identifiers can be indicating an alert identifier. For example, based on the alert identifier, an analyst may retrieve information related to the transaction that caused the alert from the transaction parameter database or user parameter database of FIG. 1.

The result list 300 also includes a second column 308 for a score generated by the result list generation system. The score is a value between zero and one where zero indicates the least suspicious alert and one indicates the most suspicious alert. In various implementations, the value is multiplied by 100 to generate a percentage for easier evaluation by an analyst. As shown, alert identifier 123 has the highest score of 0.8 and alert identifier 345 has the lowest score of 0.2. The result list 300 is organized in order of most suspicious to least suspicious, providing the analyst first with the alerts that may require the most time and fastest response. A third column 312 includes a most influential feature. In various implementations, the third column 312 may include a set of the most influential features, for example, three features.

As an example, the score of alert identifier 123 was most influenced by the account age. That is, the result list generation system increased the score of the alert corresponding to the identifier in large part due to how long the account had been open. Similarly, for the score of alert identifiers 234 and 345, the features that decreased the score were based on a previous peak credit (over a threshold period, for example, the last 12 months) and an amount total of the underlying transaction.

Figure 4:
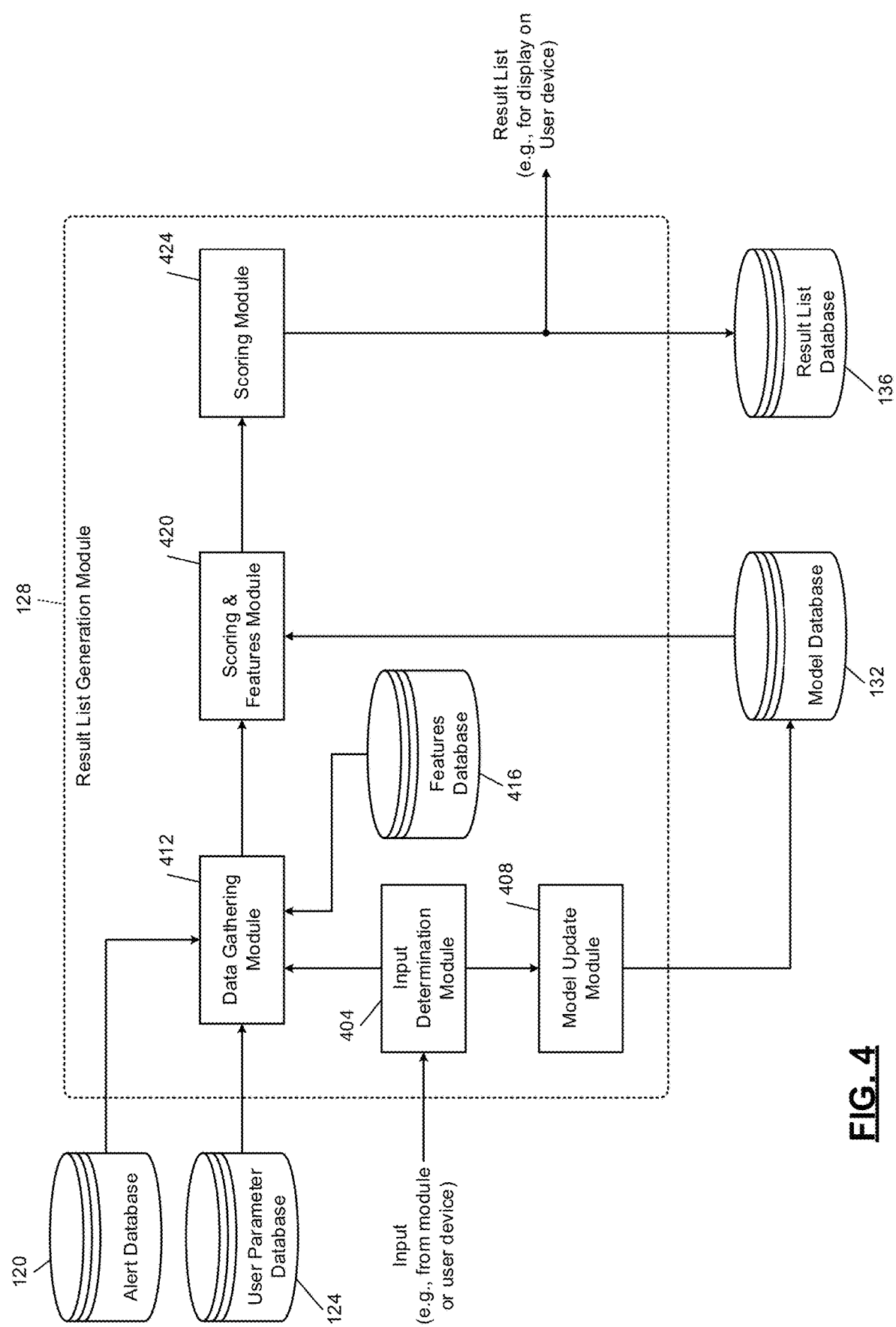
FIG. 4 is a functional block diagram of an example result list generation module.

FIG. 4 is a functional block diagram of an example result list generation module 128. The result list generation module 128 can operate at set intervals or in response to a corresponding alert generation module generating a list of alerts. In various implementations, an analyst may request the generation of a result list via user input on a user device through, for example, a web portal. As noted previously, analysts may also provide feedback in order to improve and continuously update the models generating the scores. Therefore, the result list generation module 128 may also receive input in the form of feedback regarding a particular score for a particular AML scenario.

In an example implementation, an input determination module 404 of the result list generation module 128 may receive an indication that a list of alerts was generated for a particular AML scenario. The input determination module 404 parses and determines whether the input is feedback regarding the particular AML scenario or a prompt to generate a result list for the particular AML scenario. Feedback regarding the particular AML scenario is forwarded to a model update module 408. The model update module 408 is configured to update and improve the accuracy of the corresponding AML model stored in the model database 132.

Feedback received from an analyst through the user device includes the alert to which the feedback corresponds and a "suspicious" or "not suspicious" categorization. Based on the indication of the alert to which the feedback corresponds, the model update module 408 can update and train the corresponding model in the model database 132 according to the analyst categorization. In various implementations, the feedback from the analyst may indicate the most influential feature directing the categorization by the analyst.

The input determination module 404 forwards a result list request to a data gathering module 412. The data gathering module 412 obtains data from the alert database 120, the user parameter database 124, and a features database 416 that is relevant to the result list request. For example, if the result list request is directly from an analyst through a user device, an indication from an alert generation module, or an automated request set to occur at threshold time intervals, the result list request indicates a corresponding list of alerts. Therefore, the data gathering module 412 obtains the list of alerts indicated in the request. Based on the AML scenario corresponding to the list of alerts, the data gathering module 412 obtains a corresponding feature set from a features database 416. In various implementations, the feature set for the model can be stored in the corresponding model in the model database 132.

Based on the data included in the obtained feature set, the data gathering module 412 retrieves the features from the user parameter database 124 for a user identifier indicated in the alerts of the list of alerts. In various implementations, the features may be obtained from a variety of available databases. In this way, the result list generation module 128 scores the transaction that caused the alert based on specific, relevant features of the corresponding user and account. For example, if the AML scenario is foreign activity and a specific threshold such as a specific foreign location was exceeded, then an alert is generated. However, the particular alert may be considered uninteresting or less suspicious based on the fact that the user sends the same amount of money to the same foreign account each month and the account holder has the same last name as the user.

The data gathering module 412 forwards the collected data to a scoring and features module 420. The scoring and features module 420 selects the model from the model database 132 that corresponds to the AML scenario of the list of alerts. The scoring and features module 420 calculates a score indicating a level of suspicion or a level of interest the alert presents by implementing the selected model. The selected model is a machine learning algorithm that models analyst behavior to calculate a score for the alerts based on the alert type as well as the features related to the transaction that caused the alert. The score may range from zero to one, one being the most suspicious and zero being the least suspicious. When the value is converted into a percentage, the score ranges from zero to 100, 100 being the most suspicious and zero being the least suspicious.

The scoring and features module 420 also identifies a subset of features that most influenced the score. For example, if a transaction amount was significantly beyond a threshold value, the score may be closer to one, indicating a higher level of suspicion. Therefore, the corresponding model would identify transaction amount as one of the most influential features. In various implementations, a separate machine learning algorithm may be implemented in a separate model to identify the most influential features of the score.

The score and most influential features for the alerts in the list of alerts are forwarded to a sorting module 424. The sorting module 424 generates and sorts a result list to include the alerts of the list of alerts and the corresponding score and influential features. The sorting module 424 may sort the result list in descending order, placing the most suspicious alerts at the top of the list. In this way, when reviewed by an analyst, the alerts that are most likely to involve additional analyst time or review are quickly identified and can be reviewed first. In various implementations, the result list generation module 128 may include a filtering module (not shown) that removes alerts below a threshold. The result list is stored in a result list database 136. Additionally, the result list may be immediately transmitted to and displayed on a user device of an analyst.

In various implementations, a heuristic layer or model based on analyst recommendations may be applied to adjust the score. The heuristic model may include information related to a particular account, such as the account being flagged, to mimic analyst behavior. Additional heuristics may include specific transaction types used by advisors that create enough transactions to trigger alerts or advisor fees that may trigger alerts.

Figure 5:
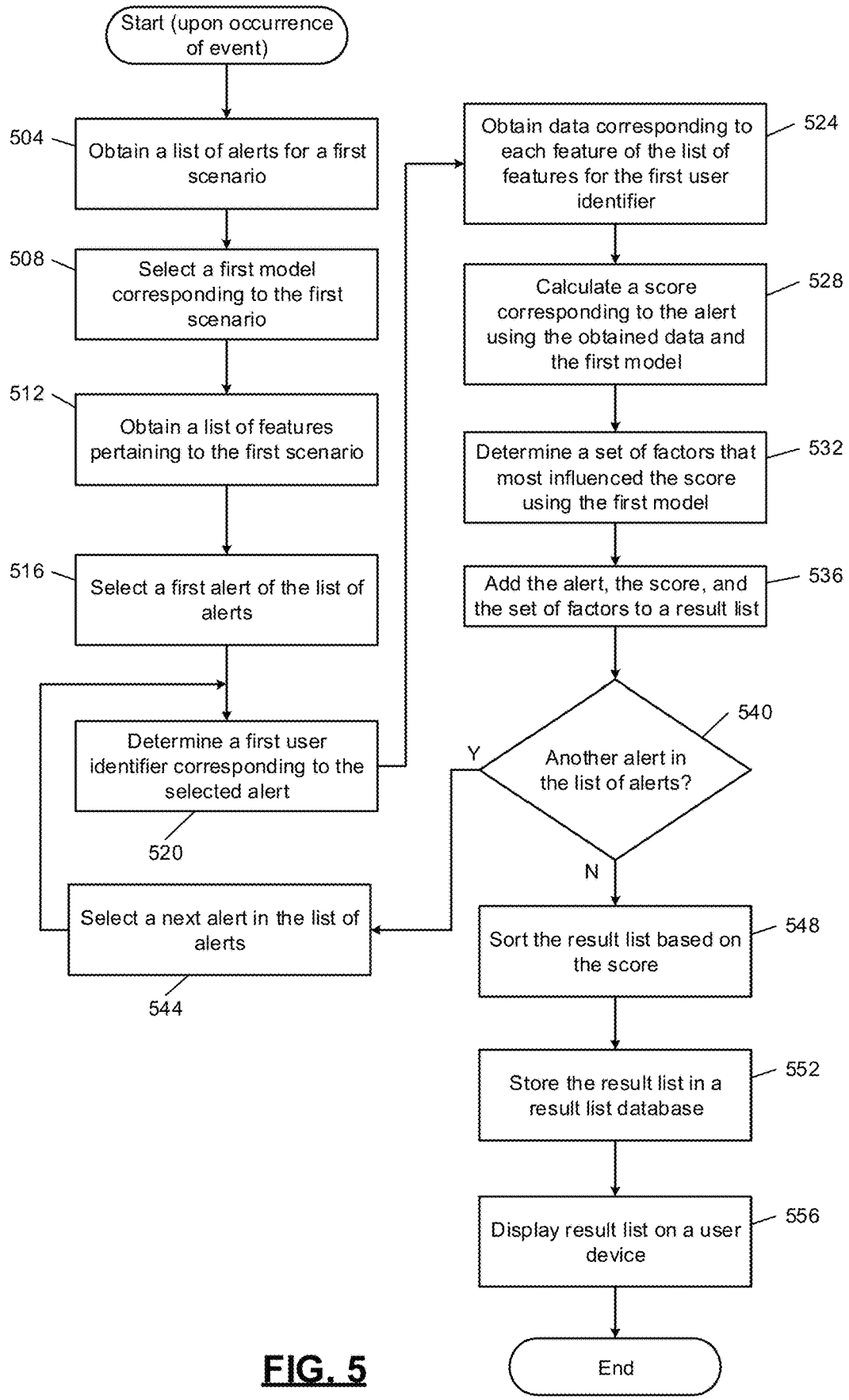
FIG. 5 is a flowchart depicting example operation of generating a result list.

FIG. 5 is a flowchart depicting example operation of generating a result list. Control begins upon the occurrence of an event. For example, the event may be a list of alerts being generated, an analyst request, or a threshold period elapsing. Control begins at 504 to obtain a list of alerts for a first scenario. As previously mentioned, the occurrence of the event indicates the list of alerts to obtain and the list of alerts indicates the first scenario. For example, if the event is the list of alerts being generated for foreign activity, then the foreign activity alerts list is obtained and the first scenario is foreign activity. Control continues to 508 to select a first model corresponding to the first scenario. That is, control selects the model that corresponds to the scenario of the list of alerts. Then, control continues to 512 to obtain a list of features pertaining to the first scenario. The list of features or the feature set is the number of features that an analyst would consider when reviewing an alert to determine how suspicious the activity that caused the alert appears.

Control continues to 516 to select a first alert of the list of alerts. Control proceeds to 522 determine a first user identifier corresponding to the selected alert. The first user identifier relates to the user that performs a transaction or performed an activity that caused the alert. In various implementations, control may also determine a first account identifier. Control continues to 524 to obtain data corresponding to each feature of the list of features for the first user identifier. Then, control proceeds to 528 to calculate a score corresponding to the alert using the obtained data and the first model. Control continues to 532 to determine a set of factors that most influenced the score using the first model.

At 536, control adds the alert, the score, and the set of features to a result list. Control continues to 540 to determine if another alert is in the list of alerts. If yes, control proceeds to 544 to select a next alert in the list of alerts and returns to 520. Otherwise, if another alert is not in the list of alerts, control continues to 548 to sort the result list based on the scores. In various implementations, the result list is sorted to include the alerts with the most suspicious score at the top. In various implementations, the result list may be sorted according to the most influential feature of in a different, ascending order. Then, control continues to 552 to store the result list in a result list database. Control proceeds to 556 to display the result list user device. Then, control ends.

Figure 6:
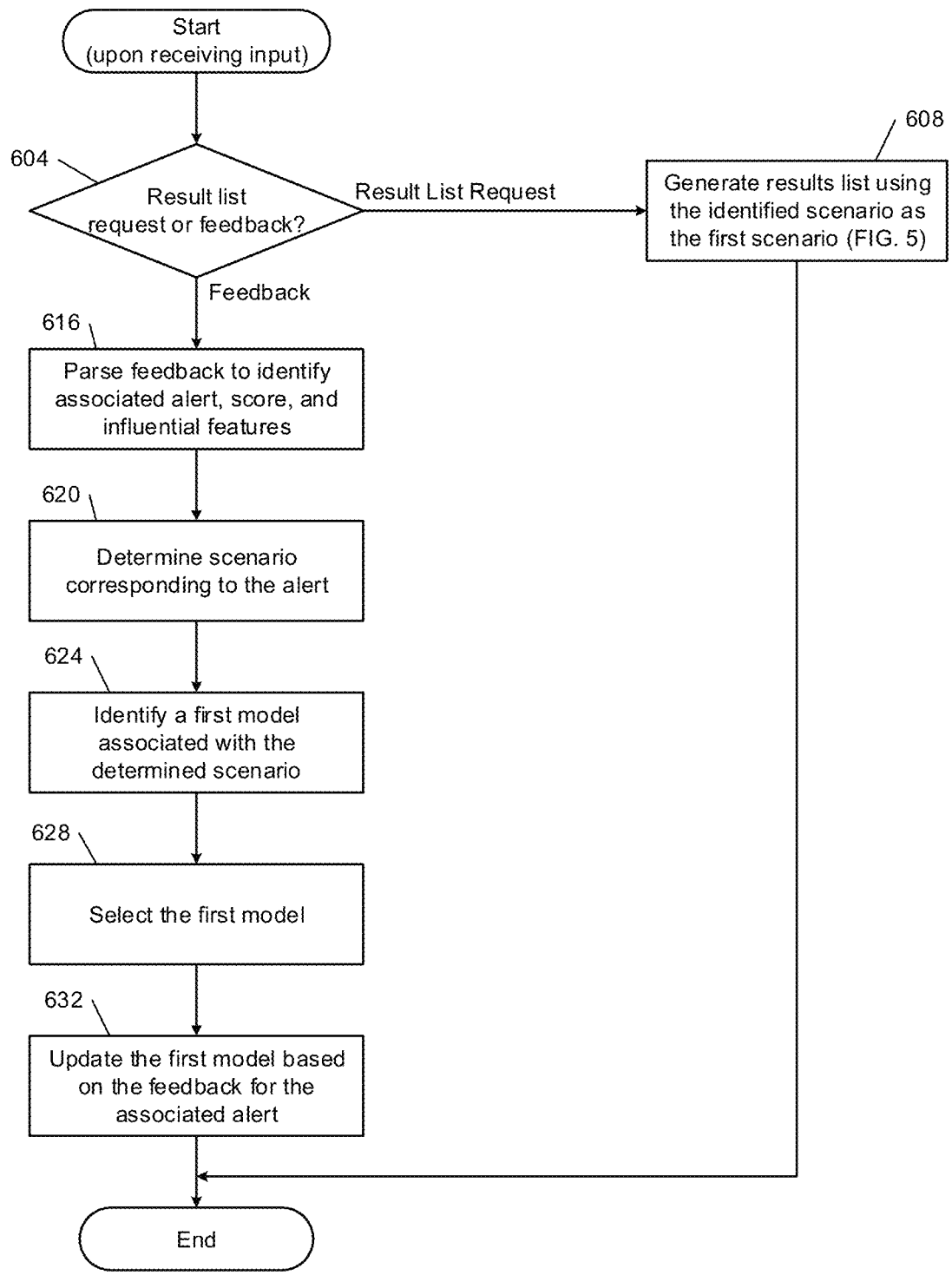
FIG. 6 is a flowchart depicting example operation of updating a machine learning model with analyst feedback.

FIG. 6 is a flowchart depicting example operation of updating a machine learning model with analyst feedback. Control begins upon receiving input. As described previously, control may receive input from a user or input in the form of indications from other modules in the system that a list of alerts has been completed. At 604, control determines if the input is a result list request or feedback from an analyst. If the input is a result list request, control proceeds to 608 to generate a result list using the list of alerts included in the result list request (as shown in the flowchart of FIG. 5). Then, control ends.

Otherwise, if control determines at 604 that the input is feedback from an analyst, control continues to 616. At 616, control parses the feedback to identify an associated alert, a score, and the listed influential features. Control continues to 620 determine the scenario that corresponds to the alert (for example, one of AML scenarios listed above). Control continues to 624 to identify a first model associated with the determined scenario. Then, at 628, control selects the first model. Control continues to 632 to update the first model based on the feedback for the associated alert. As described above, the feedback can be a binary indication of whether the analyst considers the alert suspicious or not suspicious. In this way, the first model is continuously updated with additional training data. In various implementations, the feedback may include additional information—for example, the analyst could provide an analyst score and most influential features to fine tune the model to analyst behavior. Then, control ends.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. The phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
   at least one processor; and
   at least one memory, wherein the memory stores an alert database, a model database, a parameter database, and a features database;
   the at least one memory configured to, with the at least one processor, cause the system to perform, in response to an event,
   obtaining a set of alerts stored in the alert database for a scenario;
   selecting a model from the model database for the scenario;
   identifying a set of features from the features database for the scenario;
   for each alert of the obtained set of alerts,
     retrieving parameters from the parameter database corresponding to a user identifier of the alert;
     inputting the parameters and the identified set of features into the selected model;
     determining, with the selected model, a score for the alert based on the parameters and the identified set of features;
     assigning a weight to each feature of the identified set of features based on how influential the feature is to the scenario;
     dividing the identified set of features into a first subset of features and a second subset of features, the first subset of features being more influential on the determined score for the alert than the second subset of features based on the assigned weights, the first subset of features and the second subset of features being mutually exclusive;

adding the alert, the determined score, and the first subset of features to a result list; and causing a user device to display the result list.

2. The system of claim 1 wherein the identified set of features represents features used by the selected model to score an alert.

3. The system of claim 1 wherein the event includes receiving a request from a user device indicating the set of alerts.

4. The system of claim 1 wherein the event includes a first threshold time elapsing.

5. The system of claim 1 wherein each alert of the obtained set of alerts includes: (i) a transaction identifier and (ii) a threshold exceeded.

6. The system of claim 1 wherein the parameter database includes, for the user identifier: (i) an account type, (ii) a total account amount, (iii) a trading frequency, and (iv) an average trading amount.

7. The system of claim 1 wherein the memory is further configured to cause the system to perform sorting the result list based on the score of each alert of the obtained set of alerts.

8. The system of claim 1 wherein:

the memory is further configured to cause the system to perform, in response to receiving analyst feedback corresponding to a first alert of the obtained set of alerts, updating the selected model based on the analyst feedback and a first score corresponding to the first alert and the analyst feedback indicates whether the first alert is (i) important or (ii) unimportant.

9. The system of claim 1 wherein:

the memory stores a result list database and the memory is further configured to cause the system to perform storing the result list in the result list database.

10. A method comprising:

in response to an event, obtaining a set of alerts from an alert database corresponding to a scenario;

selecting a model from a model database for the scenario;

identifying a set of features stored in a features database for the scenario;

for each alert of the set of alerts, retrieving parameters of the identified set of features from a parameter database corresponding to a user identifier of the alert;

inputting the retrieved parameters into the selected model;

determining a score for the alert using the selected model based on the identified set of features;

assigning a weight to each feature of the identified set of features based on how influential the feature is to the scenario;

dividing the identified set of features into a first subset of features and a second subset of features, the first subset of features being more influential on the determined score for the alert than the second subset of features based on the assigned weights, the first subset of features and the second subset of features being mutually exclusive; and adding the alert, the determined score, and the first subset of features to a result list; and causing a user device to display the result list.

11. The method of claim 10 wherein the identified set of features represents features used by the selected model to score an alert.

12. The method of claim 10 wherein the event includes receiving a request from a user device indicating the set of alerts.

13. The method of claim 10 wherein the event includes a first threshold time elapsing.

14. The method of claim 10 wherein each alert of the obtained set of alerts includes: (i) a transaction identifier and (ii) a threshold exceeded.

15. The method of claim 10 wherein the parameter database includes, for the user identifier: (i) an account type, (ii) a total account amount, (iii) trading frequency, and (iv) an average trading amount.

16. The method of claim 10 further comprising sorting the result list based on the score of each alert of the obtained set of alerts.

17. The method of claim 10 further comprising, in response to receiving analyst feedback corresponding to a first alert of the obtained set of alerts:

updating the selected model based on the analyst feedback and a first score corresponding to the first alert, wherein the analyst feedback indicates whether the first alert is (i) important or (ii) unimportant.

18. The method of claim 10 further comprising:

storing the result list in a result list database.

* * * * *